US011356632B2

(12) United States Patent
Murali et al.

(10) Patent No.: US 11,356,632 B2
(45) Date of Patent: Jun. 7, 2022

(54) DISPLAY-INFORMATION GENERATING APPARATUS, INFORMATION PROCESSING APPARATUS, AND IMAGING SYSTEM

(71) Applicant: FUJIFILM Business Innovation Corp., Tokyo (JP)

(72) Inventors: Suresh Murali, Kanagawa (JP); Shingo Uchihashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 277 days.

(21) Appl. No.: 16/261,592

(22) Filed: Jan. 30, 2019

(65) Prior Publication Data

US 2019/0246059 A1 Aug. 8, 2019

(30) Foreign Application Priority Data

Feb. 7, 2018 (JP) .............................. JP2018-020237

(51) Int. Cl.
*H04N 5/445* (2011.01)
*H04N 5/268* (2006.01)
*H04N 5/247* (2006.01)
*H04N 7/18* (2006.01)

(52) U.S. Cl.
CPC ......... *H04N 5/44504* (2013.01); *H04N 5/247* (2013.01); *H04N 5/268* (2013.01); *H04N 7/181* (2013.01)

(58) Field of Classification Search
CPC .......... B64C 2201/123; H04N 5/44504; H04N 5/247; H04N 5/268; H04N 7/181; H04N 5/2624
See application file for complete search history.

(56) References Cited

U.S. PATENT DOCUMENTS

| 7,777,783 | B1 | 8/2010 | Chin et al. |
| 7,944,454 | B2 | 5/2011 | Zhou et al. |
| 10,510,203 | B2 * | 12/2019 | Masuda ............... B42D 25/328 |
| 10,660,515 | B2 * | 5/2020 | Sumiya .................. A61B 3/102 |

(Continued)

FOREIGN PATENT DOCUMENTS

| JP | 2007080262 | 3/2007 |
| JP | 2008005450 | 1/2008 |

(Continued)

OTHER PUBLICATIONS

"Office Action of Japan Counterpart Application", dated Jan. 5, 2022, with English translation thereof, pp. 1-6.

*Primary Examiner* — Paulos M Natnael
(74) *Attorney, Agent, or Firm* — JCIPRNET

(57) ABSTRACT

A display-information generating apparatus includes a shooting-area acquisition unit, an arrangement deriving unit, and a generating unit. For each of multiple imaging apparatuses, the shooting-area acquisition unit acquires information about a shooting area of the imaging apparatus. The arrangement deriving unit obtains a three-dimensional arrangement of the shooting area on the basis of the information about the shooting area. The three-dimensional arrangement is obtained when the shooting area is viewed in a three-dimensional space. The generating unit generates display information for a display apparatus displaying the three-dimensional arrangement.

9 Claims, 9 Drawing Sheets

(56) References Cited

U.S. PATENT DOCUMENTS

| | | | | |
|---|---|---|---|---|
| 2006/0022808 A1* | 2/2006 | Ito | ............ | G08G 1/167 |
| | | | | 340/425.5 |
| 2007/0076946 A1* | 4/2007 | Kunisaki | ............ | G01B 21/042 |
| | | | | 382/153 |
| 2014/0107462 A1* | 4/2014 | Wanda | ............ | A61B 5/0095 |
| | | | | 600/407 |
| 2017/0323507 A1* | 11/2017 | Masuda | ............ | G07D 7/20 |
| 2019/0008377 A1* | 1/2019 | Sumiya | ............ | G02B 26/101 |
| 2020/0027242 A1* | 1/2020 | Koyama | ............ | G06T 7/70 |
| 2020/0106968 A1* | 4/2020 | Shuden | ............ | H04N 5/2723 |

FOREIGN PATENT DOCUMENTS

| | | |
|---|---|---|
| JP | 2011130234 | 6/2011 |
| WO | 2011059659 | 5/2011 |

* cited by examiner

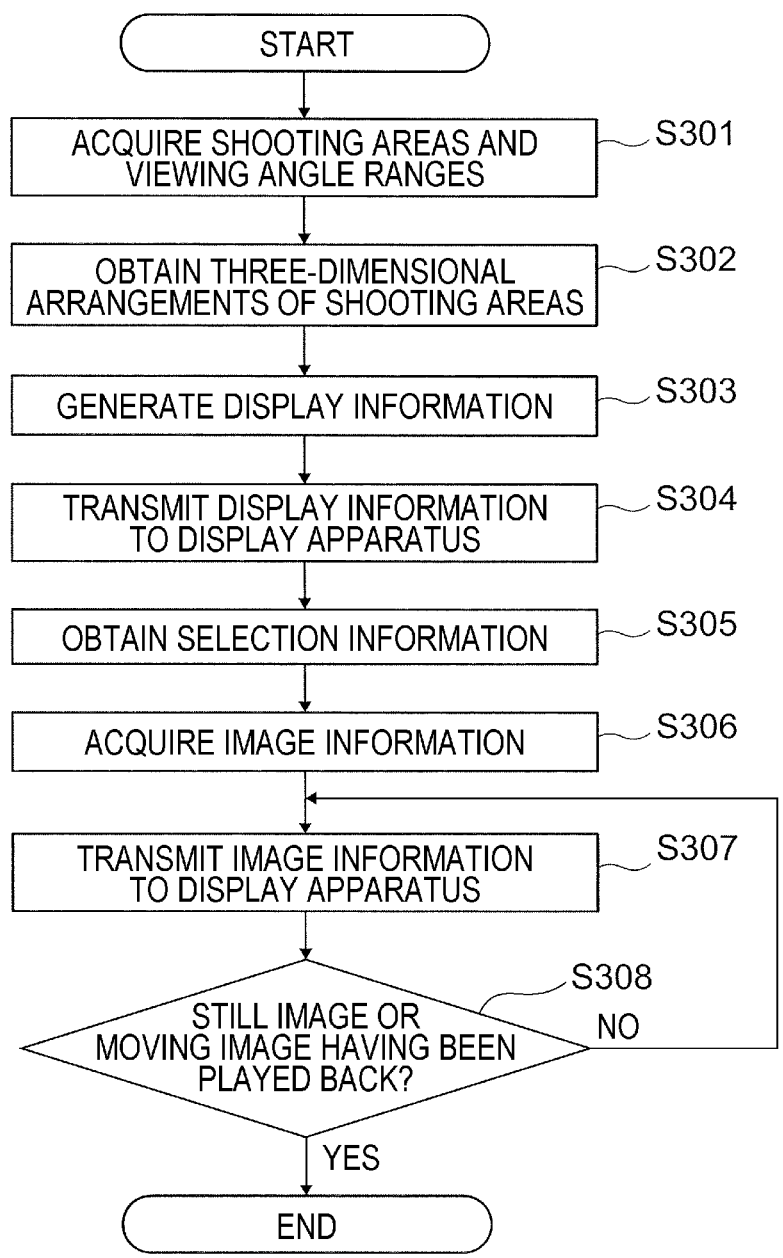

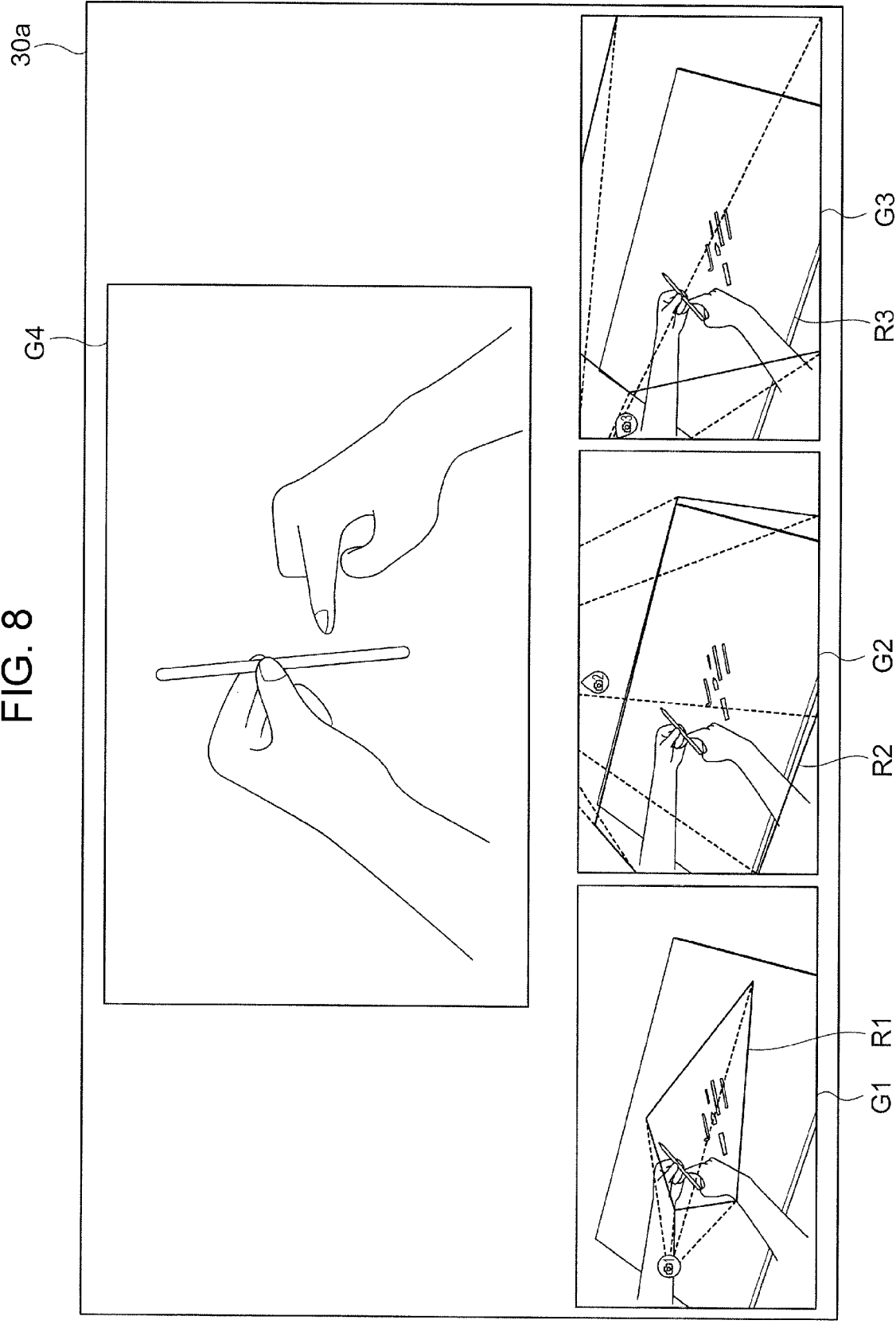

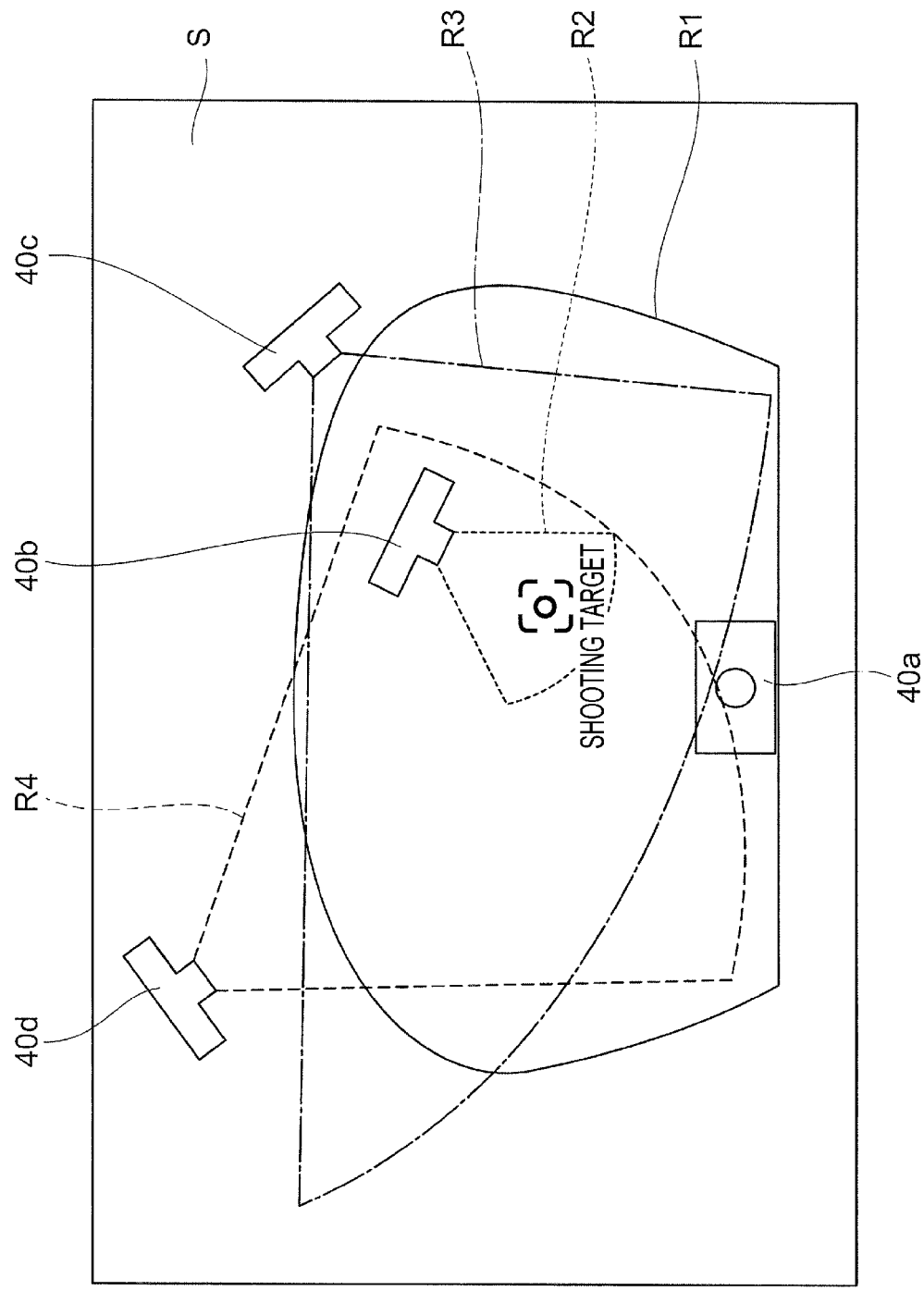

DISPLAY-INFORMATION GENERATING APPARATUS, INFORMATION PROCESSING APPARATUS, AND IMAGING SYSTEM

CROSS-REFERENCE TO RELATED APPLICATIONS

This application is based on and claims priority under 35 USC 119 from Japanese Patent Application No. 2018-020237 filed Feb. 7, 2018.

BACKGROUND

(i) Technical Field

The present disclosure relates to a display-information generating apparatus, an information processing apparatus, and an imaging system.

(ii) Related Art

Heretofore, there has been present a technique in which multiple imaging apparatuses such as cameras are used to provide content, such as sports and news, by switching among images captured by the respective imaging apparatuses.

Japanese Unexamined Patent Application Publication No. 2007-80262 describes the following technique. In the technique, a content analysis module generates a three-dimensional semantic layout of a site under surveillance. A rendering module integrates video streams from multiple cameras with the semantic layout into a three-dimensional immersive environment, and renders the video streams in multiple displays on a user navigation interface. The user navigation interface allows a user to perform at least one of the following operations: selecting from multiple views for each of the displays; and tracking a moving object in the video streams with the largest screen resolution of the display in the displays having the best view of the object.

Multiple images are captured by multiple imaging apparatuses, and a user switches among the images. Thus, a shooting target may be viewed from different shooting positions and different shooting angles.

However, it is difficult to grasp, at a glance of the images, their shooting positions and their different shooting angles. Therefore, the user may have difficulty in determining which image is to be selected.

SUMMARY

Aspects of non-limiting embodiments of the present disclosure relates to a display-information generating apparatus and the like. Even when multiple imaging apparatuses capture multiple images, the display-information generating apparatus and the like enable the shooting positions and the shooting angles of the imaging apparatuses to be easily grasped, facilitating selection of an image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a display-information generating apparatus including a shooting-area acquisition unit, an arrangement deriving unit, and a generating unit. For each of multiple imaging apparatuses, the shooting-area acquisition unit acquires information about a shooting area of the imaging apparatus. The arrangement deriving unit obtains a three-dimensional arrangement of the shooting area on the basis of the information about the shooting area. The three-dimensional arrangement is obtained when the shooting area is viewed in a three-dimensional space. The generating unit generates display information for a display apparatus displaying the three-dimensional arrangement.

BRIEF DESCRIPTION OF THE DRAWINGS

Exemplary embodiments of the present disclosure will be described in detail based on the following figures, wherein:

FIG. 7 is a flowchart of operations performed by a terminal apparatus according to a second exemplary embodiment;

FIG. 8 is a diagram illustrating an exemplary screen displayed on a display screen of a display apparatus; and FIG. 9 is a diagram illustrating the case in which the shooting areas of cameras are displayed on a single screen.

DETAILED DESCRIPTION

Exemplary embodiments of the present disclosure will be described in detail below by referring to the attached drawings.

Description about the Entire Imaging System

Figure 1:
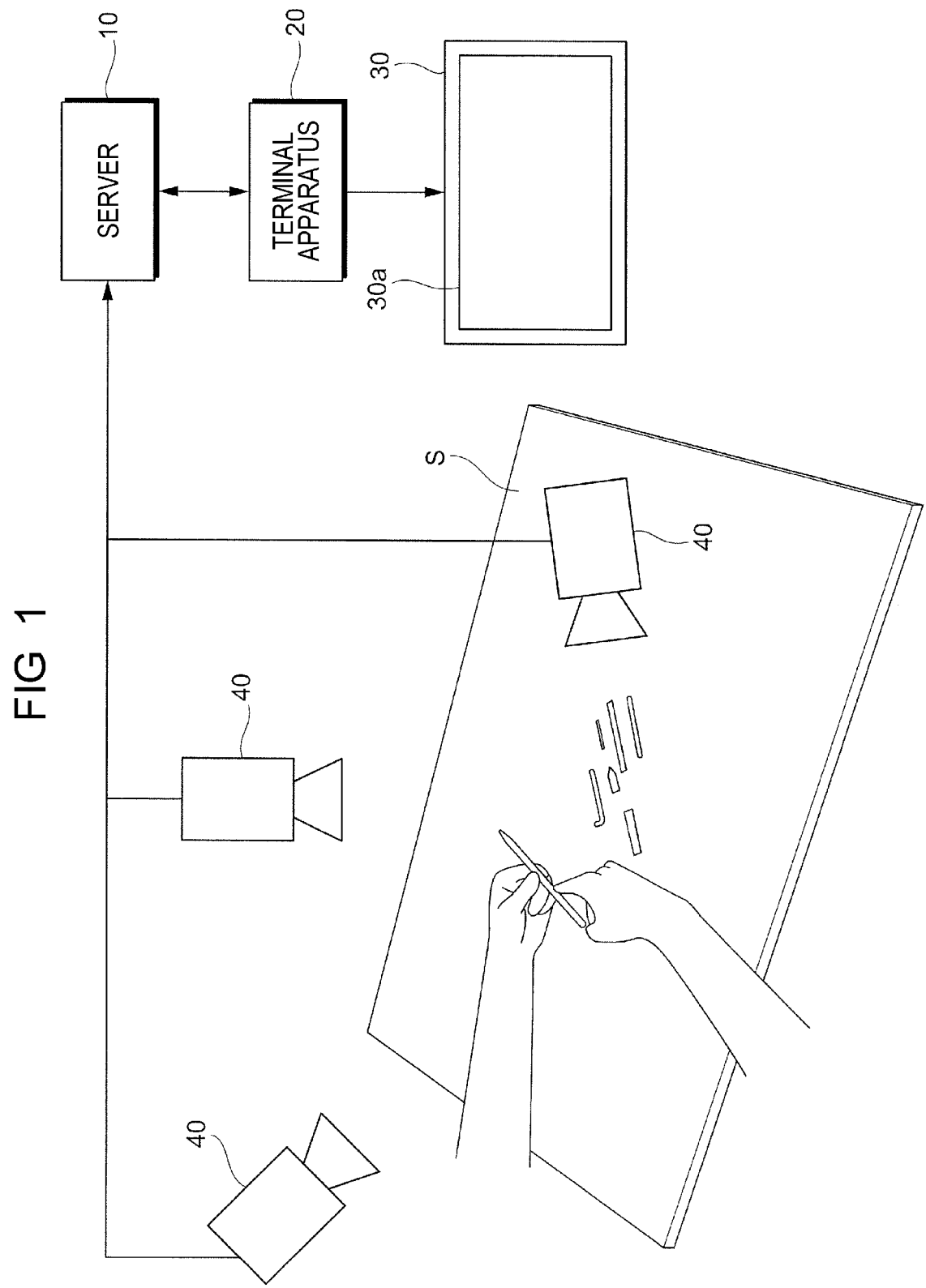
FIG. 1 is a diagram illustrating a configuration example of an imaging system according to an exemplary embodiment.

FIG. 1 is a diagram illustrating an exemplary configuration of an imaging system 1 according to an exemplary embodiment.

As illustrated in FIG. 1, the imaging system 1 according to the exemplary embodiment includes a server 10 that determines the shooting areas of multiple cameras 40, a terminal apparatus 20 that generates display information, a display apparatus 30 that displays an image on the basis of the display information generated by the terminal apparatus 20, and the multiple cameras 40 that take photographs of predetermined areas on a predetermined surface S.

The server 10, which is an exemplary information processing apparatus, is a server computer that manages the entire imaging system 1. As described below in detail, the server 10 collects information about the shooting conditions of the cameras 40, and determines the shooting areas of the cameras 40 on the basis of the shooting conditions.

The terminal apparatus 20, which is an exemplary display-information generating apparatus, is, for example, a so-called general-purpose personal computer (PC). The terminal apparatus 20 operates various types of application software under the control of an operating system (OS) so as to perform information processing and the like according to the exemplary embodiment. As described in detail below, the terminal apparatus 20 determines three-dimensional arrangements obtained when the shooting areas of the cameras 40 are viewed in a space, and generates display information for displaying the three-dimensional arrangements.

The server 10 and the terminal apparatus 20 each include a central processing unit (CPU) that serves as a computing unit, and a main memory and a hard disk drive (HDD) which serve as a storage. The CPU executes various types of software, such as an OS (operating system, basic software) and application programs (application software). The main memory is a storage area used to store various types of software, and data and the like which are used in execution of the software. The HDD is a storage area used to store, for example, input data for various type of software and output data from various types of software.

The server 10 includes a communication interface for communicating with the outside, and also includes an input unit. The input unit is formed of a keyboard, a mouse, and the like. The input unit is used to activate and terminate application software for the exemplary embodiment, and is used for user input of instructions.

The display apparatus 30 displays an image on a display screen 30a. The display apparatus 30 includes a unit having a function of displaying an image, such as a liquid-crystal display for a PC, a liquid-crystal television set, or a projector. Therefore, the display method used in the display apparatus 30 is not limited to the liquid-crystal type. In the example in FIG. 1, the display screen 30a is disposed in the display apparatus 30. However, when, for example, a projector is used as the display apparatus 30, the display screen 30a corresponds to a screen or the like disposed outside the display apparatus 30.

Each of the cameras 40, which is an exemplary imaging apparatus, includes, for example, an optical system that converges incident light, and an image sensor that is an imaging unit detecting light converged by the optical system.

The optical system includes a single lens or a combination of multiple lenses. In the optical system, various aberrations are removed, for example, through the combination of lenses and coating applied on lens surfaces. The image sensor is formed by arranging imaging devices, such as charge coupled devices (CCDs) or complementary metal oxide semiconductors (CMOSs).

The server 10 and the terminal apparatus 20 are connected to each other, for example, over a network. The network is, for example, a local area network (LAN) or the Internet.

The terminal apparatus 20 and the display apparatus 30 are connected to each other, for example, through Digital Visual Interface (DVI). Instead of DVI, the terminal apparatus 20 and the display apparatus 30 may be connected to each other, for example, via high-definition multimedia interface (HDMI®) or DisplayPort.

The server 10 and the cameras 40 are connected to each other, for example, via Universal Serial Bus (USB). Instead of USB, the server 10 and the cameras 40 may be connected to each other, for example, via IEEE1394 or RS-232C. However, this is not limiting. Wireless connection, such as a wireless LAN or Bluetooth®, may be used.

Operations performed in the imaging system 1 will be schematically described.

The multiple cameras 40 each photograph a shooting target. In the example in FIG. 1, the shooting target is an image of an operation of assembling an object. Imaging information obtained through the photographing is transmitted to the server 10 for storage. The server 10 obtains information about the photographing using the multiple cameras 40, and determines the shooting areas of the cameras 40 by using the obtained information. The terminal apparatus 20 determines three-dimensional shooting areas on the basis of the shooting areas determined by the server 10. The terminal apparatus 20 generates display information for displaying the three-dimensional shooting areas. The display information is transmitted to the display apparatus 30 for display. A user who views the screen displayed on the display apparatus 30 may operate an input unit of the terminal apparatus 20, and may select a camera 40 that takes a photograph of a shooting area which the user wants to view. Thus, image information of a shooting target photographed in the shooting area desired by the user is downloaded from the server 10, and is displayed on the display apparatus 30.

Description about the Server 10 and the Terminal Apparatus 20

Figure 2:
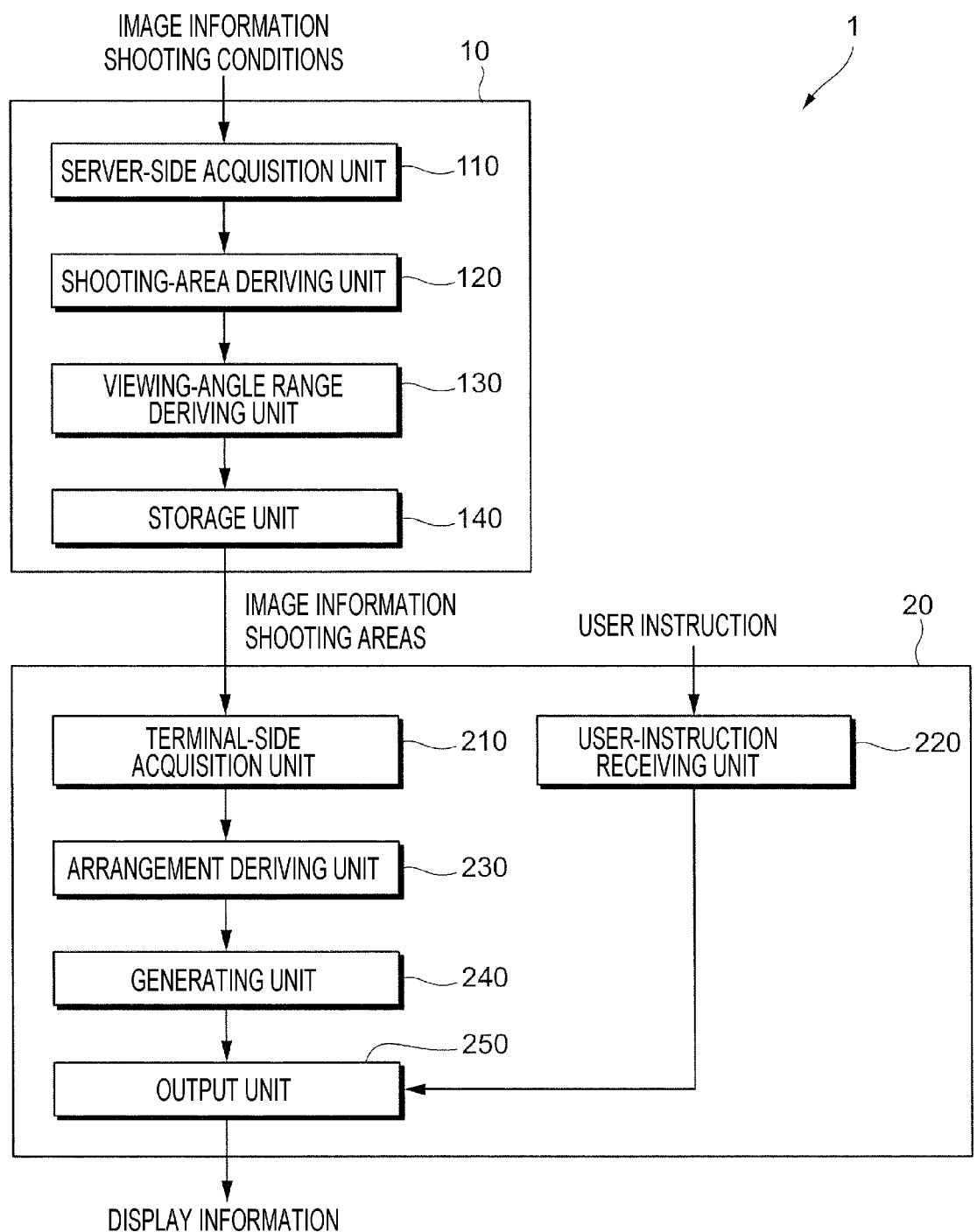
FIG. 2 is a block diagram illustrating a functional configuration example of a server and a terminal apparatus according to the exemplary embodiment.

FIG. 2 is a block diagram illustrating a functional configuration example of the server 10 and the terminal apparatus 20 according to the exemplary embodiment. FIG. 2 illustrates functions which are related to the exemplary embodiment and which are obtained by selecting from the various functions of the server 10 and the terminal apparatus 20.

As illustrated in FIG. 2, the server 10 according to the exemplary embodiment includes a server-side acquisition unit 110, a shooting-area deriving unit 120, a viewing-angle range deriving unit 130, and a storage unit 140. The server-side acquisition unit 110 acquires image information from the cameras 40. The shooting-area deriving unit 120 obtains the shooting areas of the cameras 40. The viewing-angle range deriving unit 130 obtains the viewing angle ranges of the cameras 40. The storage unit 140 stores the image information, the shooting areas, and the viewing angle ranges.

The server-side acquisition unit 110 acquires image information of images captured by using the respective cameras 40. The server-side acquisition unit 110, which is an exemplary shooting-condition acquisition unit, acquires the shooting conditions of the cameras 40. The "shooting conditions" indicate items that are set in photographing using the cameras 40. The shooting conditions according to the exemplary embodiment are classified into space conditions and settings conditions. The space conditions indicate the positions and the angles of the cameras 40 in a three-dimensional space and the position and the angle of the shooting target in the three-dimensional space. Specifically, for example, the space conditions include the positions and the angles of the cameras 40, the position and the angle of the shooting target, and the position and the angle of the surface on which the shooting target is disposed, and also include the distances between the cameras 40 and the shooting target. The settings conditions indicate setting values which are set to the cameras 40. Specifically, the settings conditions indicate, for example, the focal lengths, the lens apertures, the zooming factors, and the resolutions of the cameras 40.

The server-side acquisition unit 110 acquires the shooting conditions from the cameras 40 or through user input. The shooting conditions stored in the storage unit 140 in advance may be obtained from the storage unit 140.

The shooting-area deriving unit 120 obtains the shooting areas of the cameras 40 on the basis of the shooting conditions. At that time, a shooting area indicates an area in a common area for the cameras 40. The "common area" indicates an area photographed commonly by the cameras 40, and is a surface on which the shooting target is disposed. When a shooting area is disposed on a plane, the common area indicates the plane. As illustrated in FIG. 1, when the shooting target is disposed on a desk, the common area is the surface S of the desk.

The viewing-angle range deriving unit 130 obtains the viewing angle ranges of the cameras 40. The viewing angle ranges of the cameras 40 may be obtained from the shooting conditions described above.

The storage unit 140 stores the image information acquired by the server-side acquisition unit 110. The storage unit 140 also stores the shooting areas obtained by the shooting-area deriving unit 120, and the viewing angle ranges obtained by the viewing-angle range deriving unit 130.

The terminal apparatus 20 according to the exemplary embodiment includes a terminal-side acquisition unit 210, a user-instruction receiving unit 220, an arrangement deriving unit 230, a generating unit 240, and an output unit 250. The terminal-side acquisition unit 210 acquires the image information, the shooting areas, the viewing angle ranges, and the like. The user-instruction receiving unit 220 receives user instructions. The arrangement deriving unit 230 obtains the three-dimensional arrangements of the shooting areas. The generating unit 240 generates display information for displaying the three-dimensional arrangements. The output unit 250 outputs the display information.

The terminal-side acquisition unit 210 acquires the image information from the storage unit 140 of the server 10. The terminal-side acquisition unit 210, which is an exemplary shooting-area acquisition unit, acquires information about the shooting areas of the cameras 40 from the storage unit 140. The terminal-side acquisition unit 210 also acquires the viewing angle ranges of the cameras 40 from the storage unit 140.

As described in detail below, the user-instruction receiving unit 220 receives, as a user instruction, an instruction indicating which camera 40 among the cameras 40 is to be selected. That is, an instruction indicating which shooting area is to be selected from the shooting areas of the cameras 40 is received. The user-instruction receiving unit 220 also receives an instruction indicating which position, at which the three-dimensional arrangements of the shooting areas which will be described in detail below are viewed, is to be selected.

The arrangement deriving unit 230 obtains the three-dimensional arrangements of the shooting areas produced when the shooting areas are viewed in the three-dimensional space, on the basis of the information about the shooting areas. A three-dimensional arrangement indicates a view of a shooting area obtained from a certain position in the three-dimensional space. The arrangement deriving unit 230 obtains the three-dimensional arrangements, for example, by performing space calculation and arranging the shooting areas as a 3D model in the space.

The generating unit 240 generates pieces of display information for displaying the shooting areas on the display apparatus 30 which displays an image including the surface S. That is, the generating unit 240 generates display information for the display apparatus 30 displaying the three-dimensional arrangements, which are obtained by the arrangement deriving unit 230, of the shooting areas on the surface S. The display information may be generated, for example, by using HTML5 canvas which operates on a web browser.

The generating unit further generates additional display information as the display information. The "additional display information" is additional information about the shooting areas. More specifically, the "additional display information" is additional information for indicating the relative positions of the three-dimensional arrangements of the shooting areas in the space. The additional display information, which will be described in detail below, is, for example, information indicating the positions of the cameras 40, display information indicating the viewing angles of the cameras 40, and image information of a real object.

The output unit 250 outputs, to the display apparatus 30, the display information generated by the generating unit 240. Thus, the display apparatus 30 displays the three-dimensional arrangements of the shooting areas of the cameras 40.

Description about Display Information

Figure 3A:
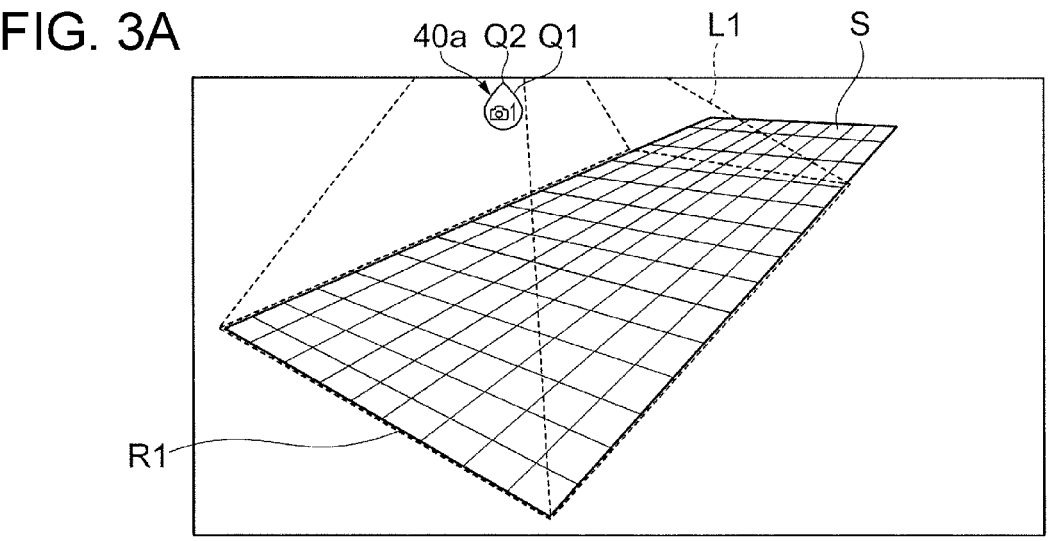
FIGS. 3A to 3C are diagrams illustrating actual examples in which display information generated by a generating unit is displayed on a display screen of a display apparatus.
Figure 3B:
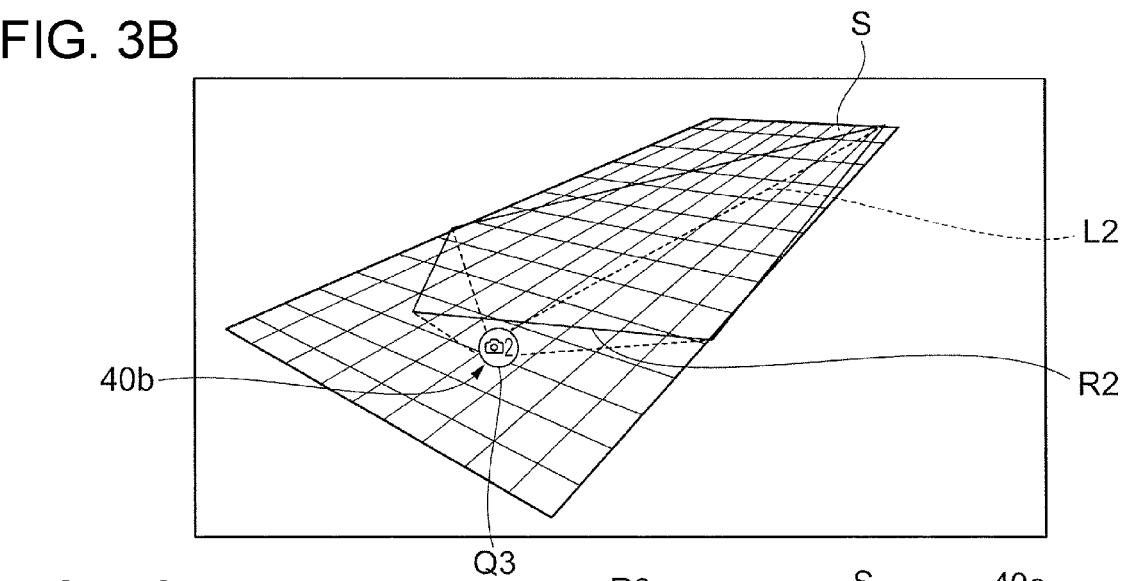
Figure 3C:
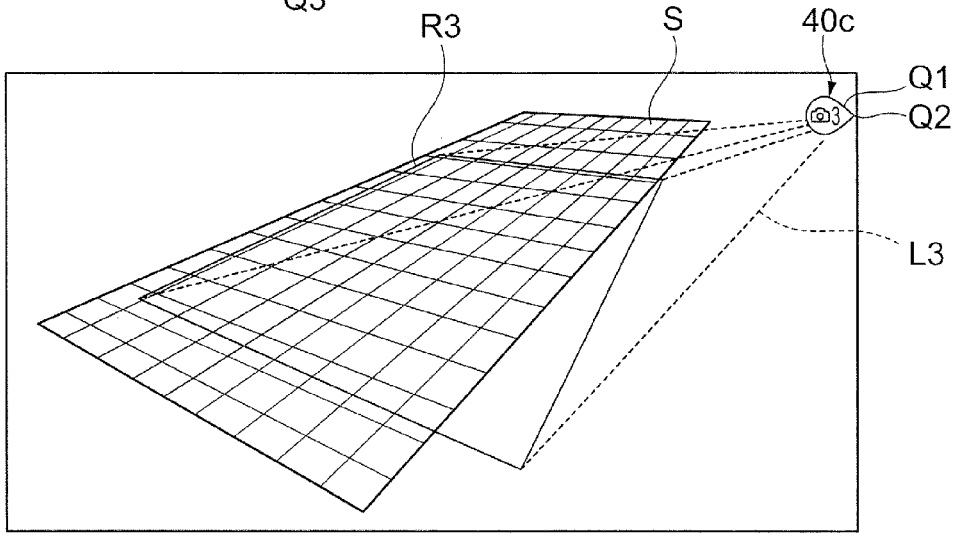

FIGS. 3A to 3C are diagrams illustrating actual examples in which display information generated by the generating unit 240 is displayed on the display screen 30a of the display apparatus 30. FIGS. 3A to 3C illustrate examples in which pieces of display information for three respective cameras 40 are displayed on the display apparatus 30.

FIG. 3A illustrates the case in which the three-dimensional arrangement of the shooting area R1 is displayed for a camera 40a, whose camera ID is 1, among the three cameras 40 on the basis of the display information, which is generated by the generating unit 240, for displaying the three-dimensional arrangements of the cameras 40. The shooting area R1 is rectangular as illustrated in FIG. 3A, and is a part of the predetermined surface S.

In this example, as the additional display information, display information for displaying the surface S, which is the common area, as the background along with the shooting area R1 is generated and displayed. In this case, the background is displayed as a figure prepared in advance. In the example in FIG. 3A, the figure indicates a schematic view representing the surface S. The "schematic view" is a figure which schematically represents the surface S and objects disposed around the surface S. In this example, the surface S is drawn as a schematic view by using a mesh surface. The schematic view may be a figure illustrated by using a polygon. A figure representing the background is not limited to this. For example, a layout view illustrating the surface S may be used. The "layout view" is a figure illustrating the arrangement of the surface S and objects around the surface S. The layout view is, for example, a map or a design drawing.

The example in which display information indicating the position of the camera 40a is generated as additional display information and in which the position of the camera 40a is displayed is illustrated. The camera 40a is located outside the display screen 30a. Therefore, the position of the camera 40a is illustrated by using a mark Q1 having a water droplet shape. In this case, the camera 40a is positioned in the direction in which the top Q2 of the water droplet is oriented. That is, in this case, the camera 40a is positioned above the mark Q1.

The example in which the generating unit 240 generates display information indicating the viewing angle of the camera 40a as additional display information and in which the viewing angle of the camera 40a is displayed is illustrated. The viewing angle of the camera 40a is indicated by using lines L1 that connect the camera 40a to the outer borders of the shooting area R1. The lines L1 are displayed as four dotted lines connecting the camera 40a to the four corners of the rectangular shooting area R1.

FIG. 3B illustrates the case in which the three-dimensional arrangement of the rectangular shooting area R2 on the predetermined surface S is displayed for a camera 40*b*, whose camera ID is 2, among the three cameras 40. In this example, the position of the camera 40*b* is displayed, and the viewing angle of the camera 40*b* is indicated by using four lines L2 connecting the camera 40*b* to the four corners of the rectangular shooting area R2. In this case, the camera 40*b* is positioned inside the display screen 30*a*. A circular mark Q3 indicates the position of the camera 40*b*.

Similarly, FIG. 3C illustrates the case in which the three-dimensional arrangement of the rectangular shooting area R3 on the predetermined surface S is displayed for a camera 40*c*, whose ID is 3, among the three cameras 40. The position of the camera 40*c* is displayed, and the viewing angle of the camera 40*c* is indicated by using four lines L3 connecting the camera 40*c* to the four corners of the rectangular shooting area R3. Also in this case, the camera 40*c* is positioned outside the display screen 30*a*. Therefore, the mark Q1 having a water droplet shape indicates the position of the camera 40*c*. In this case, it is indicated that the camera 40*c* is positioned in the direction in which the top Q2 of the water droplet is oriented, and that the camera 40*c* is positioned on the right of the mark Q1.

Description about Operations of the Imaging System

Operations in the imaging system 1 will be described.

The operations performed by the server 10 in the imaging system 1 will be described. In this example, the number of cameras 40 is N.

Figure 4:
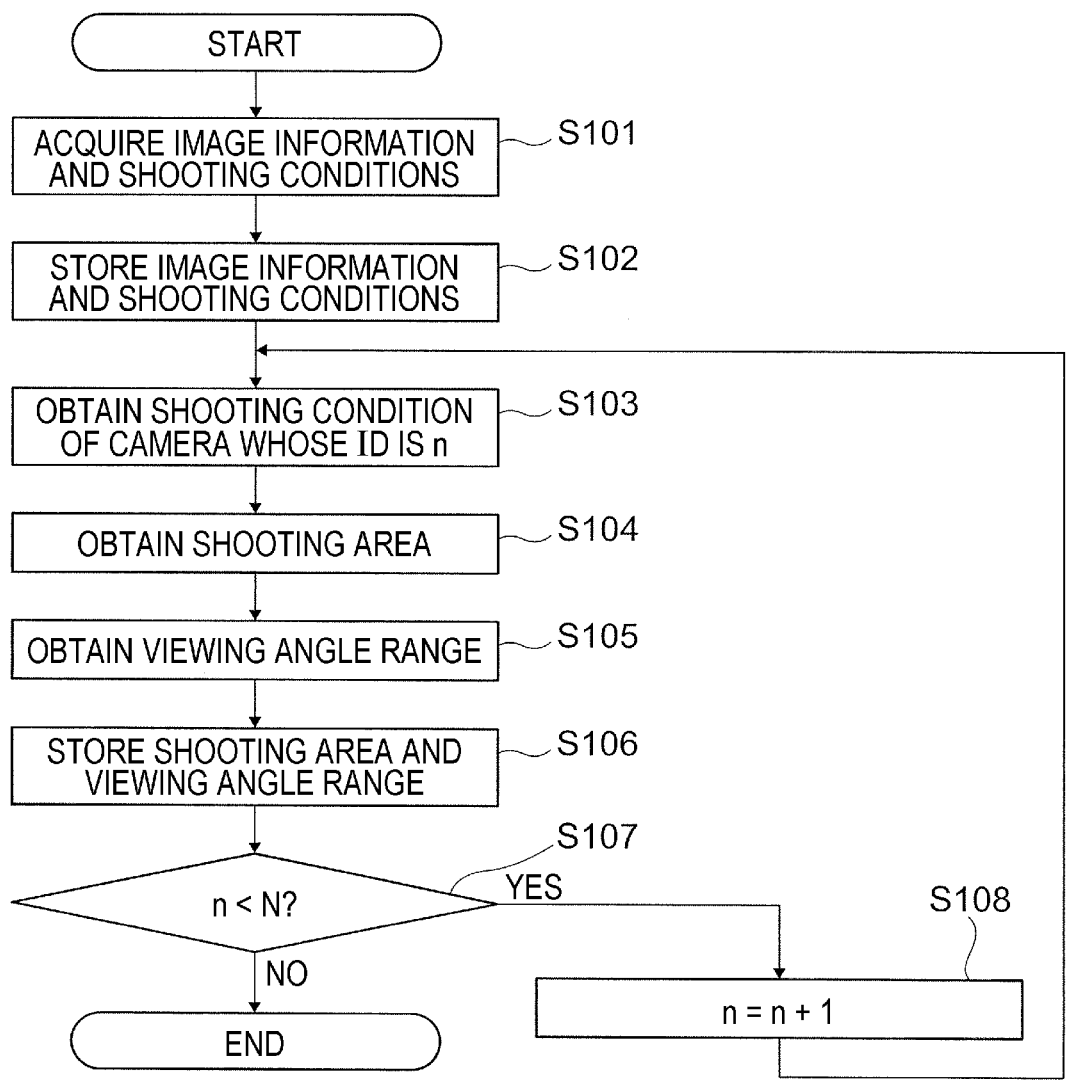
FIG. 4 is a flowchart of operations performed by a server according to the exemplary embodiment.

FIG. 4 is a flowchart of operations performed by the server 10 according to the exemplary embodiment.

The server-side acquisition unit 110 acquires image information and shooting conditions of the multiple cameras 40 (step 101).

The server-side acquisition unit 110 associates the shooting conditions as metadata of the image information, and stores the shooting conditions and the image information in the storage unit 140 (step 102).

The shooting-area deriving unit 120 obtains the shooting condition of the camera 40 whose camera ID is n (step 103). The initial value of n is 1.

The shooting-area deriving unit 120 obtains the shooting area of the camera 40 on the basis of the shooting condition (step 104).

The viewing-angle range deriving unit 130 obtains the viewing angle range of the camera 40 on the basis of the shooting condition (step 105).

The shooting area and the viewing angle range are stored in the storage unit 140 (step 106).

The shooting-area deriving unit 120 determines whether or not n is less than N (step 107).

If the result indicates that n is less than N (Yes in step 107), the shooting-area deriving unit 120 adds 1 to n (step 108), and the process returns to step 103.

If n is not less than N (No in step 107), the series of processes end.

Operations performed by the terminal apparatus 20 in the imaging system 1 will be described.

First Exemplary Embodiment

Operations performed by the terminal apparatus 20 according to a first exemplary embodiment will be described. In the first exemplary embodiment, the case in which a user selects a camera 40 whose shooting area is displayed will be described.

Figure 5:
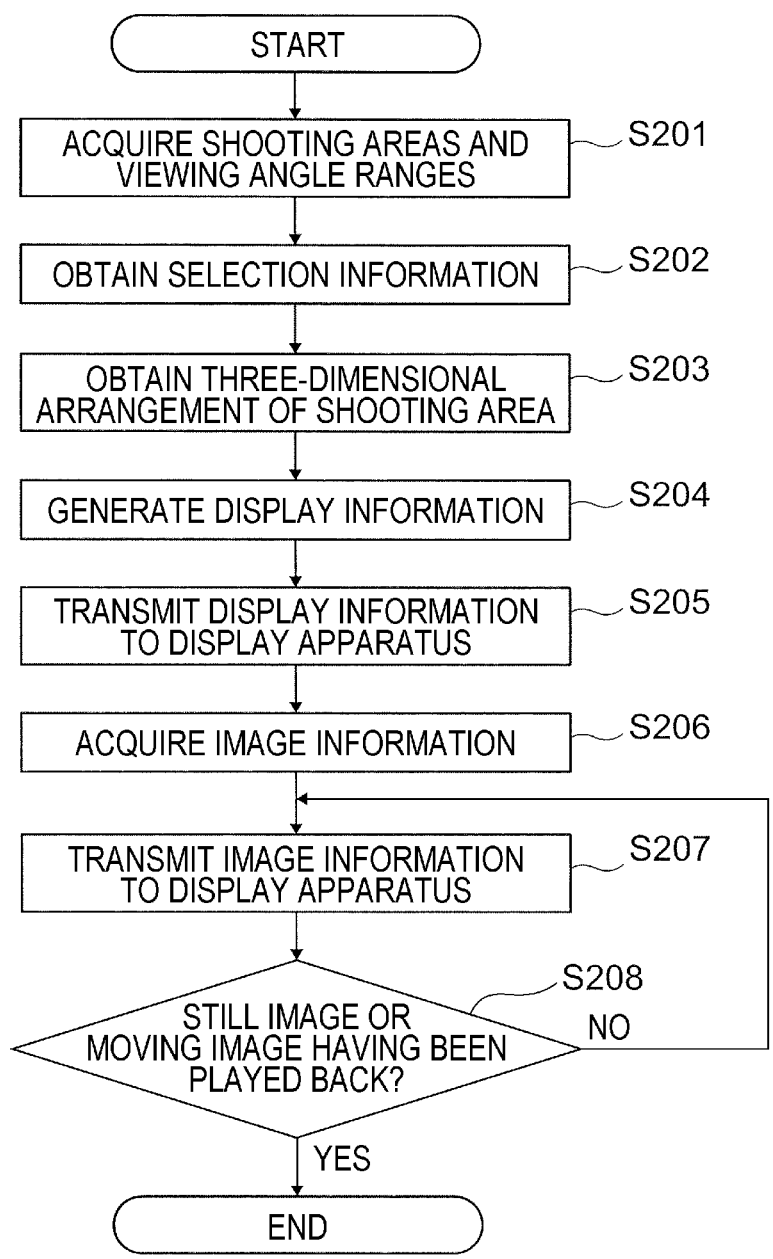
FIG. 5 is a flowchart of operations performed by a terminal apparatus according to a first exemplary embodiment.

FIG. 5 is a flowchart of the operations performed by the terminal apparatus 20 according to the first exemplary embodiment.

The terminal-side acquisition unit 210 acquires the shooting areas and the viewing angle ranges of the multiple cameras 40 from the storage unit 140 of the server 10 (step 201).

The user-instruction receiving unit 220 obtains selection information indicating which camera 40 is to be selected (step 202). The "selection information" is information indicating the camera 40 selected by the user. The selection information describes, for example, a camera ID.

The arrangement deriving unit 230 obtains a three-dimensional arrangement produced when the shooting area is viewed in the space, on the basis of information about the shooting area (step 203).

The generating unit 240 generates display information for the display apparatus 30 that displays the three-dimensional arrangement (step 204).

The output unit 250 transmits, to the display apparatus 30, the display information generated by the generating unit 240 (step 205). As a result, the display apparatus 30 displays the three-dimensional arrangement of the shooting area of the selected camera 40.

When the user who views the three-dimensional arrangement judges that there is no problem in selection of the camera 40, for example, the user selects the OK button or the like (not illustrated). Thus, the terminal-side acquisition unit 210 acquires the image information of the selected camera 40 from the storage unit 140 of the server 10 (step 206).

The output unit 250 transmits the image information to the display apparatus 30 (step 207). As a result, the display apparatus 30 displays the image of the selected camera 40.

The output unit 250 determines whether or not the image information indicates a still image, and, if the image information indicates a moving image, determines whether or not the moving image has been played back (step 208).

If the image information does not indicate a still image and indicates a moving image that has not been played back (No in step 208), the process proceeds to step 207.

If the image information indicates a still image or a moving image that has been played back (Yes in step 208), the series of processes end.

FIGS. 6A to 6D are diagrams illustrating the three-dimensional arrangements, which are displayed on the display apparatus 30 in step 205 in FIG. 5, of the shooting areas of the cameras 40.

Figure 6A:
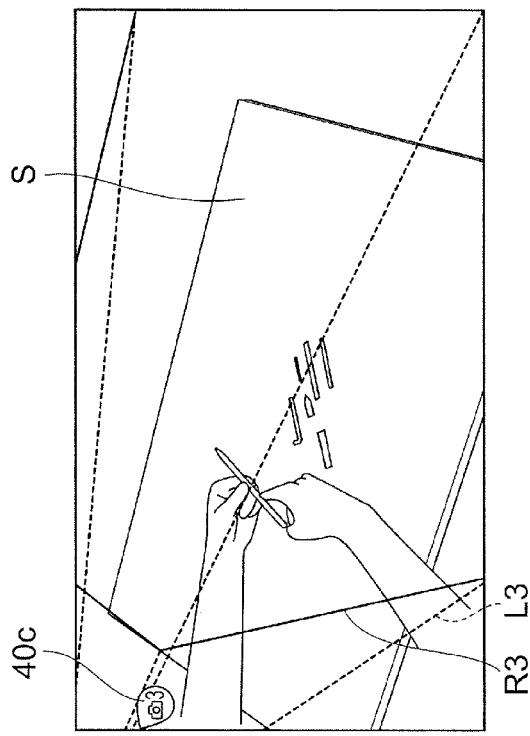
FIGS. 6A to 6D are diagrams illustrating three-dimensional arrangements, which are displayed on a display apparatus in step 205 in FIG. 5, of the shooting areas of cameras.

FIG. 6A illustrates the case in which the three-dimensional arrangement of the shooting area of the camera 40*a*, whose camera ID is 1, is displayed as display information.

As illustrated in FIG. 6A, the shooting area R1 of the camera 40*a* and the lines L1 indicating the viewing angle of the camera 40*a*, which are similar to FIG. 3A, are displayed. As additional display information, in addition to the position of the camera 40*a* and the lines L1 indicating the viewing angle of the camera 40*a*, a real-object image J obtained by actually photographing the surface S which is a common area is displayed as the background. The three-dimensional arrangement of the shooting area R1 of the camera 40*a* is superimposed on the real-object image J obtained through actual photographing using the camera 40*a*. The real-object image J indicates an area photographed commonly by the cameras 40. The image J is desirably an image in which the entire photographed area is viewed.

Figure 6C:
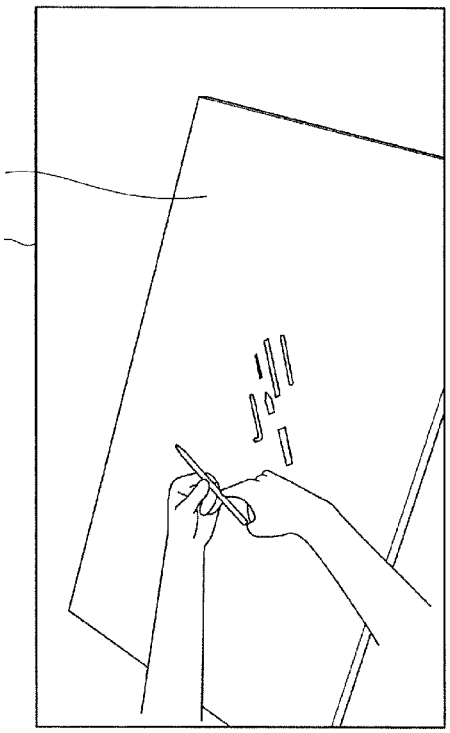
Figure 6B:
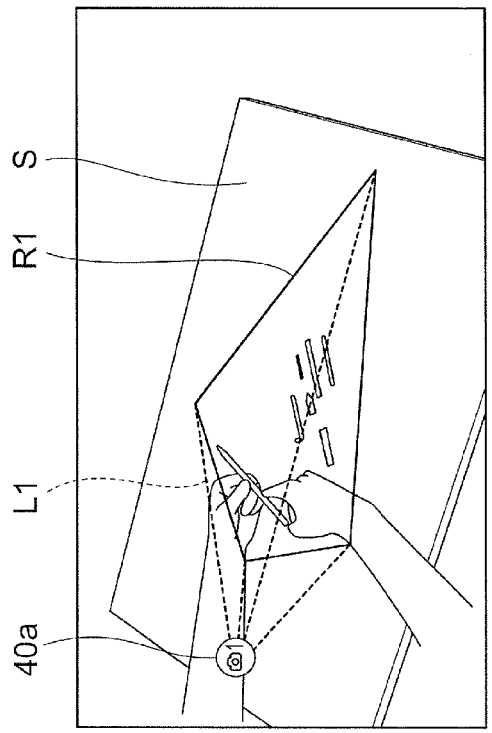
Figure 6D:
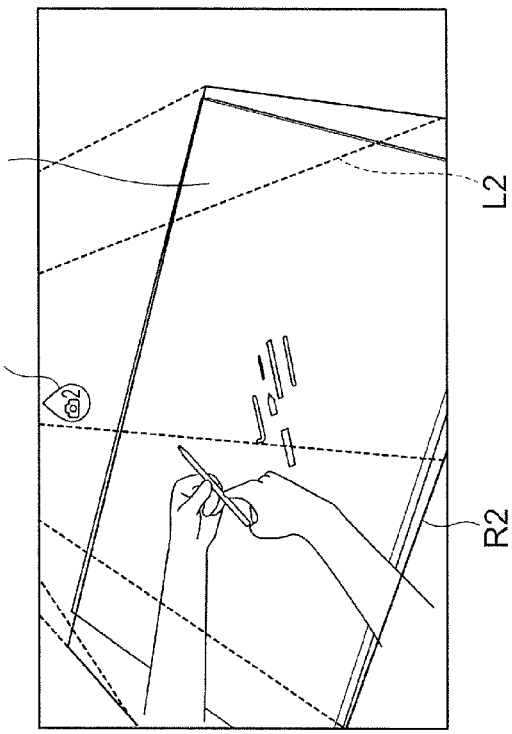

FIG. 6D illustrates the real-object image J. The real-object image J is an image obtained by photographing the shooting target and an area around the shooting target. The real-object image J may be an image captured by any of the cameras 40. As a result, a user recognizes the three-dimensional arrangement of the shooting area R1 more concretely.

FIG. 6B illustrates the case in which the three-dimensional arrangement of the shooting area of the camera 40b, whose camera ID is 2, is displayed as display information.

Similarly to FIG. 6A, in FIG. 6B, the shooting area R2 of the camera 40b, the surface S, the position of the camera 40b, and the lines L2 indicating the viewing angle of the camera 40b are displayed. The three-dimensional arrangement of the shooting area R2 of the camera 40b is superimposed on the real-object image J.

FIG. 6C illustrates the case in which the three-dimensional arrangement of the shooting area of the camera 40c, whose camera ID is 3, is displayed as display information.

Similarly to FIG. 6A, in FIG. 6C, the shooting area R3 of the camera 40c, the surface S, the position of the camera 40c, and the lines L3 indicating the viewing angle of the camera 40c are displayed. The three-dimensional arrangement of the shooting area R3 of the camera 40c is superimposed on the real-object image J.

Second Exemplary Embodiment

The operations performed by the terminal apparatus 20 according to a second exemplary embodiment will be described. In the second exemplary embodiment, the case in which a user selects a camera 40 among the cameras 40 whose shooting areas have been displayed will be described.

FIG. 7 is a flowchart of the operations performed by the terminal apparatus 20 according to the second exemplary embodiment.

The terminal-side acquisition unit 210 acquires the shooting areas and the viewing angle ranges of the cameras 40 from the storage unit 140 of the server 10 (step 301).

The arrangement deriving unit 230 obtains three-dimensional arrangements produced when the shooting areas of the cameras 40 are viewed in the space, on the basis of information about the shooting areas (step 302). That is, the three-dimensional arrangements of the shooting areas of all of the cameras 40 that are being used are obtained.

The generating unit 240 generates display information for the display apparatus 30 which displays the three-dimensional arrangements (step 303).

The output unit 250 transmits, to the display apparatus 30, display information generated by the generating unit 240 (step 304). As a result, the display apparatus 30 displays the three-dimensional arrangements of the shooting areas of the cameras 40. A user who views the three-dimensional arrangements selects a camera 40.

FIG. 8 is a diagram illustrating an exemplary screen displayed on the display screen 30a of the display apparatus 30 at that time.

As illustrated in FIG. 8, the shooting areas R1 to R3 illustrated in FIGS. 6A to 6C are displayed in images G1 to G3. One of the images G1 to G3 is selected through clicking using an input unit such as a mouse. Then, an image G4 indicating one of the shooting areas R1 to R3 is displayed. FIG. 8 illustrates the example in which the image G1 for the camera 40a is selected and in which an image of the shooting area R1 obtained through photographing using the camera 40a is displayed as the image G4.

In this case, the images G1 to G3 serve as a selecting unit that selects, among the cameras 40, a camera 40, for which the three-dimensional arrangement is to be displayed on the display apparatus 30. The image G4 serves as a switching unit that switches to an image obtained through photographing using the camera 40 selected by the selecting unit.

Back to FIG. 7, the user-instruction receiving unit 220 obtains the selection information describing the camera 40 selected by the user (step 305).

The terminal-side acquisition unit 210 acquires, from the storage unit 140 of the server 10, image information of the selected camera 40 (step 306). The subsequent steps 307 and 308 are similar to steps 207 and 208 in FIG. 6.

In this case, in step 304, multiple three-dimensional arrangements of the shooting areas of the cameras 40 are displayed on the display apparatus 30. That is, the shooting areas are collectively displayed with respect to the surface S that is a common area. Therefore, for example, the screens illustrated in FIGS. 6A to 6C may be arranged next to each other for display. That is, in this case, the three-dimensional arrangements are displayed on the respective screens for the cameras 40. This enables a user to easily compare the shooting areas of the cameras 40 with each other.

In this example, the shooting areas R1 to R3 of the cameras 40 are displayed on the respective screens for the cameras 40. That is, on each of the screens, a corresponding one of the shooting areas is superimposed, for display, on the surface S that is a common area.

The method of collectively displaying the three-dimensional arrangements of the shooting areas of the cameras 40 is not limited to this.

FIG. 9 is a diagram illustrating the case in which the shooting areas R1 to R4 of the cameras 40 are displayed on a single screen. In this case, the shooting areas R1 to R4 are superimposed, for display, on the surface S that is a common area. That is, as illustrated in FIG. 9, the three-dimensional arrangement of the shooting area R1 of the camera 40a, the three-dimensional arrangement of the shooting area R2 of the camera 40b, the three-dimensional arrangement of the shooting area R3 of the camera 40c, and the three-dimensional arrangement of the shooting area R4 of the camera 40d are superimposed, for display, on each other in a single screen. This enables a user to grasp the difference in the positional relationship among the shooting areas of the cameras 40 more easily.

According to the above-described exemplary embodiments, even when multiple cameras 40 are used to capture images, the shooting positions and the shooting angles of the cameras 40 may be easily grasped, facilitating selection of an image.

According to the above-described exemplary embodiments, the server 10 and the terminal apparatus 20 operate as separate apparatuses. Alternatively, a single apparatus into which these are integrated may operate.

For example, the imaging system 1 described above may be used in the case where the cameras 40 are security cameras and where a user who is an observer selects an image from images captured by the cameras 40. In this case, the user views the three-dimensional arrangements of the shooting areas of the cameras 40, and selects a camera 40 whose photographed area is to be an area to be watched.

For example, a product assembly process is photographed in advance and recorded by using the cameras 40 in terms of various angles and shooting areas. When a user wants to learn or check the product assembly process, the recorded information may be used. In this case, the user views the three-dimensional arrangements of the shooting areas of the cameras 40, and selects a camera 40 whose photographed area corresponds to the area, the angle, and the like with which checking is to be performed.

Description about Programs

The process performed by the server 10 according to the exemplary embodiment described above is prepared, for example, as programs such as application software.

The process performed by the server 10 according to the exemplary embodiment may be interpreted as programs for causing a computer to implement a shooting-condition acquisition function of acquiring the shooting conditions of the cameras 40, a shooting-area deriving function of obtaining the shooting areas of the cameras 40 on the basis of the shooting conditions, and a viewing-angle range deriving function of obtaining the viewing angle ranges of the cameras 40.

Similarly, the process performed by the terminal apparatus 20 according to the exemplary embodiments is prepared, for example, as programs such as application software.

Therefore, the process performed by the terminal apparatus 20 according to the exemplary embodiments may be interpreted as programs for causing a computer to implement a shooting-area acquisition function of acquiring information about the shooting areas of the cameras 40, an arrangement deriving function of obtaining three-dimensional arrangements of the shooting areas produced when the shooting areas are viewed in a three-dimensional space on the basis of information about the shooting areas, and a generating function of generating display information for the display apparatus 30 which displays the three-dimensional arrangements.

The programs for implementing the exemplary embodiments may be provided not only through a communication unit but also by storing the programs in a recording medium such as a compact disc-read-only memory (CD-ROM).

The exemplary embodiments are described. The technical scope of the present disclosure is not limited to the scope of the exemplary embodiments described above. It is clear, from the claims, that embodiments obtained by adding various changes and improvements to the exemplary embodiments described above are encompassed in the technical scope of the present disclosure.

What is claimed is:

1. A display-information generating apparatus comprising:
   a processor, configured to:
      for each of a plurality of imaging apparatuses, acquire information about a shooting area of the imaging apparatus;
      obtain a three-dimensional arrangement of the shooting area on a basis of the information about the shooting area, the three-dimensional arrangement is a three-dimensional representation of the shooting area and the imaging apparatuses when viewed in a three-dimensional space; and
      generate display information describing the shooting area with respect to the corresponding imaging apparatuses among the plurality of the imaging apparatuses;
      display the display information in the three-dimensional arrangement of each of the imaging apparatuses, wherein the three-dimensional arrangement of each of the imaging apparatuses illustrates the shooting area and the corresponding imaging apparatus in three dimensional manner.

2. The display-information generating apparatus according to claim 1,
   wherein the processor generates the display information for further displaying lines indicating a viewing angle of each of the imaging apparatuses.

3. The display-information generating apparatus according to claim 2,
   wherein the processor generates the display information for further displaying positions of the plurality of imaging apparatuses.

4. The display-information generating apparatus according to claim 2,
   wherein the processor generates the display information by superimposing the three-dimensional arrangement on an image captured by using the imaging apparatus each of the imaging apparatuses.

5. The display-information generating apparatus according to claim 1, wherein the processor is further configured to:
   display an image captured by using the selected imaging apparatus.

6. The display-information generating apparatus according to claim 1,
   wherein the processor generates the display information for further displaying information indicating a viewing angle of each of the imaging apparatuses.

7. The display-information generating apparatus according to claim 1, wherein the processor is further configured to receive a selection instruction selecting from the display information showing the three-dimensional arrangement of the plurality of the apparatuses and the corresponding shooting area, and display an image captured by at least one imaging apparatus among the plurality of the imaging apparatuses in response to the selection instruction.

8. An information processing apparatus comprising:
   a processor, configured to:
      acquire shooting conditions of a plurality of imaging apparatuses;
      obtain shooting areas of the plurality of imaging apparatuses on a basis of the shooting conditions;
      obtain viewing angle ranges of the plurality of imaging apparatuses;
      generate a three-dimensional representation illustrating the shooting area and the corresponding imaging apparatus for each of the plurality of imaging apparatus;
      display the three-dimensional representation of all of the imaging apparatus; and
      obtain selection information indicating one of the plurality imaging apparatuses being an apparatus for which the shooting area and the viewing angle range are to be displayed on the display apparatus.

9. An imaging system comprising:
   a processor, configured to:
      acquire shooting conditions of a plurality of imaging apparatuses;
      obtain shooting areas of the plurality of imaging apparatuses on a basis of the shooting conditions;
      obtain three-dimensional arrangements of the shooting areas on a basis of information about the shooting areas, each of the three-dimensional arrangements is a three-dimensional representation of the corresponding shooting area and the corresponding imaging apparatus when viewed in a three-dimensional space;
      generate display information describing the shooting area with respect to the corresponding imaging apparatus for each of the imaging apparatus;
      display the display information in the three-dimensional arrangement for all of the plurality of the imaging apparatuses, wherein the three-dimensional arrangement of each of the imaging apparatuses illustrates the shooting area and the corresponding imaging apparatus in three dimensional manner.

* * * * *